United States Patent [19]
Traylor

[11] Patent Number: 5,386,585
[45] Date of Patent: Jan. 31, 1995

[54] SELF-TIMED DATA PIPELINE APPARATUS USING ASYNCHRONOUS STAGES HAVING TOGGLE FLIP-FLOPS

[75] Inventor: Roger L. Traylor, Hillsboro, Oreg.

[73] Assignee: Intel Corporation, Santa Clara, Calif.

[21] Appl. No.: 154,639

[22] Filed: Nov. 18, 1993

Related U.S. Application Data

[63] Continuation of Ser. No. 13,070, Feb. 3, 1993, abandoned.

[51] Int. Cl.⁶ ............................................. G06F 13/00
[52] U.S. Cl. .................................. 395/800; 395/325
[58] Field of Search ............... 395/375, 425, 725, 800, 395/325; 307/680

[56] References Cited

U.S. PATENT DOCUMENTS

| | | | |
|---|---|---|---|
| 3,979,732 | 9/1976 | Hepworth et al. | 395/325 |
| 4,058,773 | 11/1977 | Clark et al. | 377/66 |
| 4,357,658 | 11/1982 | van der Ouderaa | 395/325 |
| 4,712,190 | 12/1987 | Guglielmi et al. | 395/425 |
| 4,858,110 | 8/1989 | Miyata | 395/550 |
| 4,882,704 | 11/1989 | Komori et al. | 395/325 |
| 5,083,049 | 1/1992 | Kagey | 307/480 |
| 5,187,800 | 2/1993 | Sutherland | 395/800 |
| 5,237,696 | 8/1993 | Best | 395/725 |
| 5,280,597 | 1/1994 | Takata et al. | 395/425 |

OTHER PUBLICATIONS

"A Fully Asynchronous Digital Signal . . . ", Jacobs et al., IEEE Journal of Solid State Circuit, vol. 25, No. 6, pp. 1526–1537, Dec. 1990.

"An Efficient Implementation of . . . ", David et al., IEEE Compt. Soc. Press, pp. 148–155, May 1990.

"Digital Logic and Computer Design", Morris Mano Prentice Hall, Inc. 1979, pp. 176, 260.

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A self-timed data pipeline comprised of a plurality of pipeline stages, each one incorporating at least one data latch coupled to selectively configured combinational logic is disclosed. The combinational logic is selectively configured to suit the demands of the particular data pipeline, and provides clocking to the at least one data latch in the pipeline stage. A self-timed data pipeline is thereby readily and inexpensively constructed with combinational logic and logic elements available in commodity application specific integrated circuits. The pipeline stages in the self-timed data pipeline advantageously communicate and pass data in an asynchronous fashion through the use of READY and ACKNOWLEDGE signals.

1 Claim, 7 Drawing Sheets

SELF-TIMED DATA PIPELINE APPARATUS USING ASYNCHRONOUS STAGES HAVING TOGGLE FLIP-FLOPS

This is a continuation/divisional of application Ser. No. 08/013,070 filed Feb. 3, 1993 now abandoned.

BACKGROUND OF THE INVENTION

1. Field of the Invention

The present invention relates to the area of asynchronous circuits, and more particularly, to a self-timed data pipeline apparatus and design methodology.

2. Related Application

This application is related to copending U.S. patent application Ser. No. 07/892,535, filed Jun. 1, 1992, entitled, "Self-Timed Mesh Routing Chip With Data Broadcasting."

3. Art Background

In recent years, there has been an increased interest in asynchronous circuits within the data processing arts. This increased interest is attributable to the fact that asynchronous, or self-timed circuits are able to operate at particularly fast speeds, much faster, for example, than equivalent clocked circuits. Of particular interest are data pipelines which do not operate in accordance with a globally distributed clock, but are instead, self-timed, and therefore, particularly fast. Self-timed data pipelines can be configured to perform a variety of functions including, for example, multiplication, addition, multiplexing, demultiplexing, parity checking, or message routing.

Prior art data pipelines were typically incorporated within larger, highly customized parts. These highly customized parts often used specialized elements or specialized designs at the transistor-level to construct the desired self-timed data pipeline. It will be appreciated that such an approach to designing a self-timed data pipeline suffers from a number of shortcomings. Designing and producing a data pipeline in a customized part can be a time-consuming process. It can also be costly to fabricate and test such a part. In addition, the final product of such an approach is a very application-specific, customized part which does not readily lend itself to replication or adaptation to other contexts.

As will be described, the present invention departs from the prior art approach of designing a self-timed data pipeline in a customized part using specialized elements and transistor-level designs. Instead, the present invention provides for a self-timed pipeline comprising a plurality of pipeline stages, with each pipeline stage comprised of data flip-flops and combinational logic utilizing common logic elements available in commodity application specific integrated circuits. The present invention, accordingly, provides for an inexpensive and versatile data pipeline apparatus and design methodology.

SUMMARY OF THE INVENTION

The present invention finds application in the area of asynchronous circuits, and more particularly, in the area of self-timed data pipelines. The present invention can be utilized in any context where data is pipelined including, for example, in a network interface controller within a parallel processing system. In accordance with the present invention, a self-timed data pipeline is comprised of a plurality of pipeline stages. Each of these pipeline stages comprises at least one data latch coupled to selectively configured combinational logic. The combinational logic is selectively configured to suit the demands of the particular data pipeline and provides clocking to the at least one data latch in the pipeline stage. The pipeline stages can advantageously communicate with one another, and pass data in an asynchronous fashion through the use of READY and ACKNOWLEDGE signals.

In a first embodiment, described herein, the combinational logic within a pipeline stage incorporates a first logical AND gate, a second logical AND gate, a logical OR gate, a driver, and a Toggle flip-flop. In this embodiment, a READY signal from a prior pipeline stage is coupled as a first input to the first logical AND gate, and is inverted, and coupled as a first input to the second logical AND gate. An ACKNOWLEDGE signal from a subsequent pipeline stage is coupled as a second input to the second logical AND gate, and is inverted, and coupled as a second input to the first logical AND gate. The Q output of the Toggle flip-flop is coupled as a third input to the first logical AND gate, and is inverted, and coupled as a third input to the second logical AND gate. The outputs of the first and second logical AND gates are then coupled to the input of the logical OR gate. The driver then drives the output of the logical OR gate to the clock inputs of the data flip-flops in the pipeline stage. The Q output of the Toggle flip-flop is coupled to the D input of toggle flip-flop, while the Q output of Toggle flip-flop outputs the READY signal and the ACKNOWLEDGE signal for this particular pipeline stage.

The present invention, accordingly, provides for a self-timed data pipeline comprising a plurality of pipeline stages, each pipeline stage including at least one data flip-flop and combinational logic.

BRIEF DESCRIPTION OF THE DRAWINGS

Further details are explained below with the help of the examples illustrated in the attached drawings in which.

DETAILED DESCRIPTION OF THE INVENTION

A self-timed data pipeline apparatus and design methodology is described. In the following description, for purposes of explanation, numerous details are set forth such as specific applications, bit values, data paths, data word sizes, etc., in order to provide a thorough understanding of the present invention. However, it will be apparent to one skilled in the art that these specific details are not essential to the practice of the present invention. In particular, while the present invention will be described within a particular data pipeline context, it will be appreciated that the present invention is in no way limited to this particular data pipeline context. As will be appreciated, the present invention finds application in any system utilizing data pipelining. In the description which follows, reference will be made to figures in which well known electrical structures and circuits are shown in block diagram in order not to obscure the present invention unnecessarily.

Figure 1:
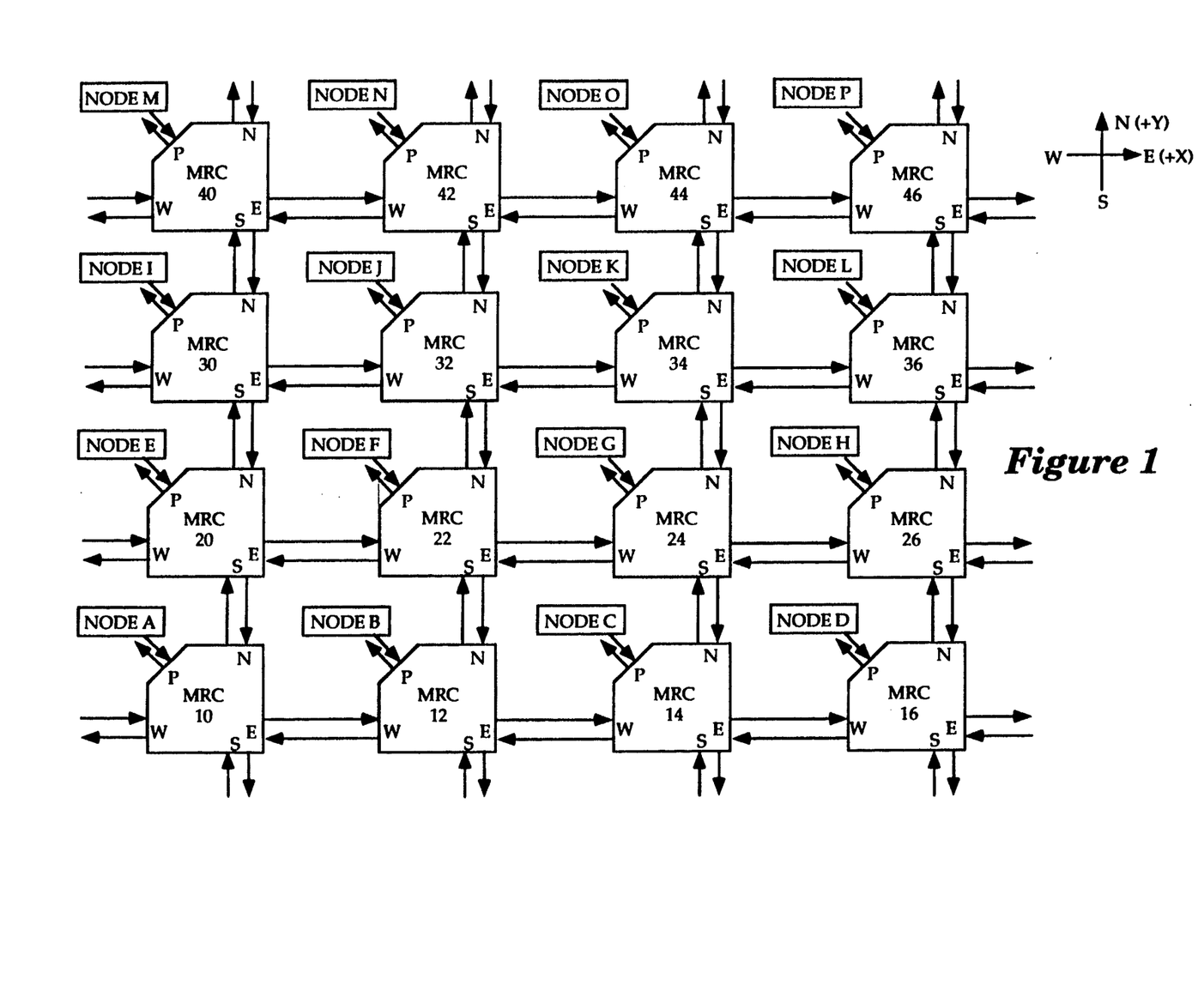
FIG. 1 illustrates a parallel processing system in which the present invention can be advantageously utilized.

Referring now to FIG. 1, this figure illustrates, in block diagram form, one possible system in which the present invention can be advantageously utilized. FIG. 1 illustrates a two dimensional mesh of message routing chips (MRC's), including message routing chips 10, 12, 14, 16, 20, 22, 24, 26, 30, 32, 34, 36, 40, 42, 44, and 46. Each message routing chip (MRC) is coupled to a processor node. In particular, message routing chips 10, 12, 14, 16, 20, 22, 24, 26, 30, 32, 34, 36, 40, 42, 44, and 46 are coupled to processor nodes A, B, C, D, E, F, G, H, I, J, K, L, M, N, O, and P, respectively. Each of the processor nodes, in turn, interfaces through a network interface controller (not shown in this figure) with an associated processor with computing power (not shown in this figure).

The associated processors, together, provide for a larger parallel processing system. In such a parallel processing system, messages or data must be transferred between the processor nodes. The four directions in which a message can travel within the mesh architecture shown in FIG. 1 are designated as North, East, West, and South. Accordingly, as shown, each message routing chip incorporates four separate routing ports, a North routing port (N), an East routing port (E), a West routing port (W), and a South routing port (S). Each message routing chip further incorporates a processor port (P) comprising a uni-directional input port for receiving data from a processor node, and a uni-directional output port for delivering data to a processor node. The internal architecture of each message routing chip is advantageously self-timed. In particular, each message routing chip comprises a number of data pipelines which operate asynchronously in a self-timed manner. Accordingly, the overall message routing system comprises a low latency, self-timed mesh routing system.

Figure 2:
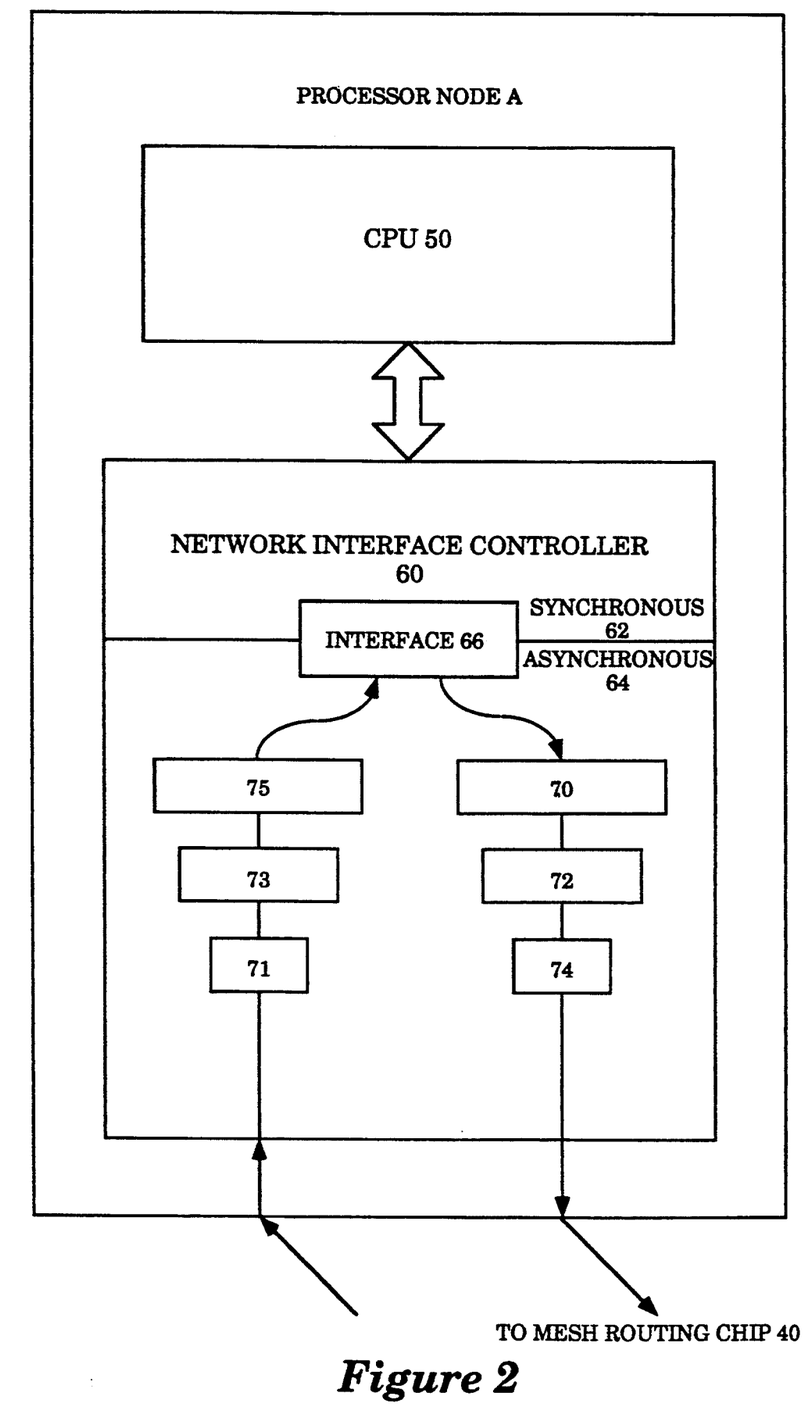
FIG. 2 illustrates, in greater detail, the composition of a processor node and the data pipelining within this processor node.

Referring now to FIG. 2, this figure illustrates in greater detail, one of the processor nodes, processor node A. Processor node A is similar in construction to the other processor nodes and is comprised of a processor, processor 50, coupled to a network interface controller (NIC), network interface controller (NIC) 60. Network interface controller 60 is, in turn, coupled to the mesh routing chip 40. Network interface controller 60 incorporates synchronous circuitry 62 which operates synchronously with the clocking of processor 50, asynchronous circuitry 64 which performs prescribed data processing functions asynchronously, and interface circuitry 66 which serves as a synchronizing interface for signals passing between synchronous circuitry 62 and asynchronous circuitry 64.

Data to be sent from processor 50 to another processor in the parallel processing system is initially coupled from processor 50 to the synchronous circuitry 62. The data is then coupled through interface circuitry 66 to a self-timed pipeline stage 70 in asynchronous circuitry 64. From self-timed pipeline stage 70, the data is coupled to self-timed pipeline stage 72, which in turn, couples the data to self-timed pipeline stage 74. Self-timed pipeline stage 74 then couples the data to mesh routing chip 40, and the data is routed through the two dimensional mesh shown in FIG. 1. In a similar fashion, data routed to processor 50 from another processor in the two dimensional mesh is coupled from mesh routing chip 40, through self-timed pipeline stages 71, 73 and 75, through interface circuitry 66, and synchronous circuitry 62, to processor 50.

As symbolically depicted in FIG. 2, self-timed pipeline stages 70, 72, and 74 can be configured such that they function to demultiplex a data word from a larger data word width at self-timed pipeline stage 70, into a smaller data word width at self-timed pipeline stage 74. In similar fashion, a data word received by network interface controller (NIC) 60 from the two dimensional mesh, can be multiplexed from a smaller data word width at self-timed pipeline stage 71, into a larger data word width at self-timed pipeline stage 75. It will be appreciated by those skilled in the art that self-timed pipeline stages such as these can be configured to manipulate data words passed from one pipeline stage to another pipeline stage in a variety of ways. Such manipulation of data in a pipeline might include, for example, multiplication, addition, multiplexing, demultiplexing, parity checking, etc., with the self-timed pipeline stages configured accordingly. As will be described, in accordance with the present invention pipeline stages such as 70, 72, and 74 can advantageously accomplish data pipelining through the use of selectively configured combinational logic and available logic components.

Figure 3:
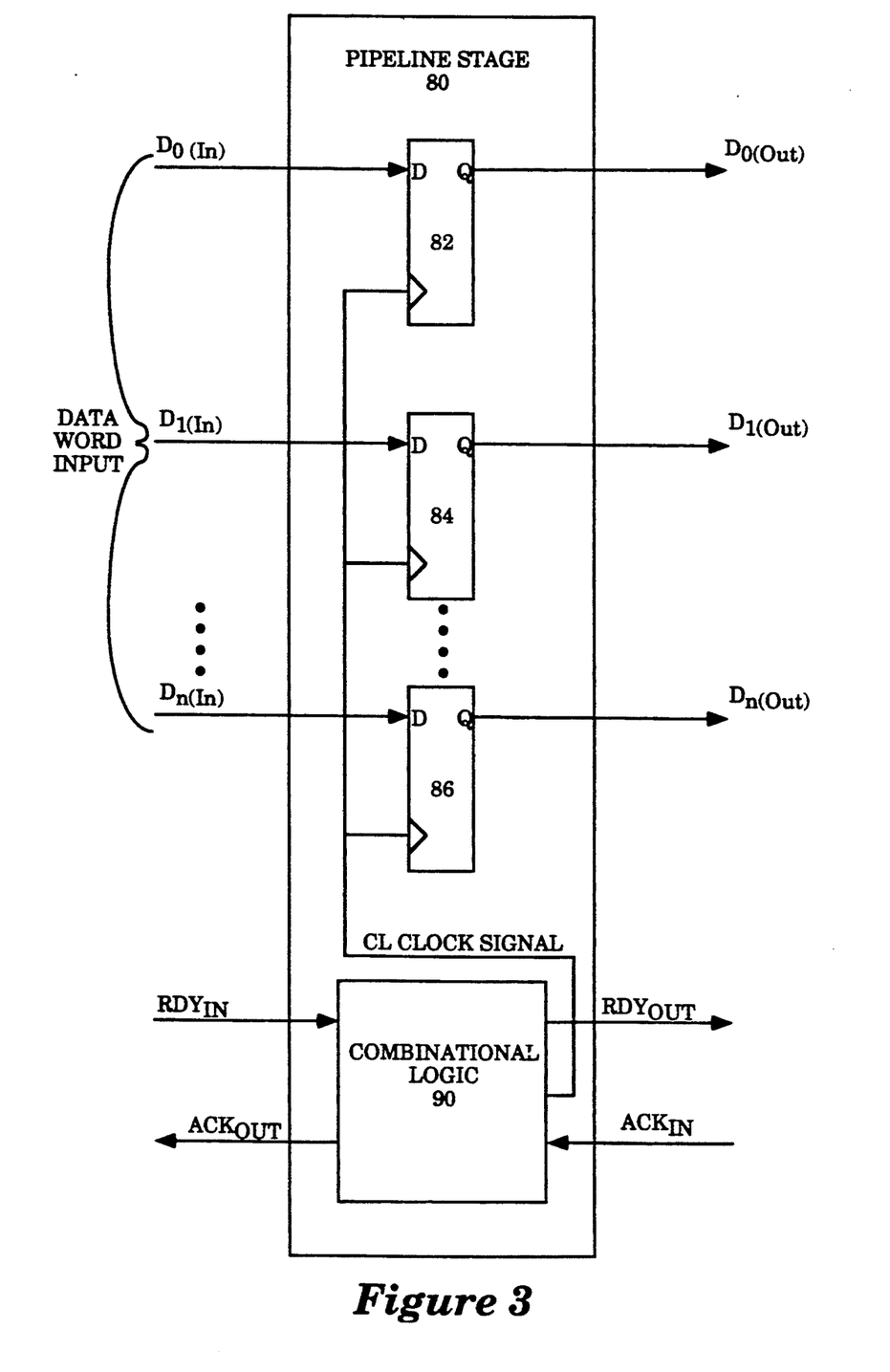
FIG. 3 illustrates a pipeline stage designed in accordance with the present invention.

With reference now to FIG. 3, this figure illustrates a self-timed pipeline stage, pipeline stage 80, designed in accordance with the present invention. A data word input to pipeline stage 80 is shown to comprise bits $D_0$, $D_1 \ldots D_n$ which are coupled, in parallel, to data inputs of pipeline stage 80. To latch and store these bits, pipeline stage 80 incorporates a comparable number of data flip-flops. For simplicity and clarity, FIG. 3 illustrates flip-flops 82, 84, and 86 to which bits $D_0$, $D_1$, and $D_n$ are coupled. (The D flip-flops corresponding to those bits between $D_1$ and $D_n$ would be similarly configured.) In accordance with the present invention, pipeline stage 80 further includes a block of combinational logic 90 comprised of logic gates. Combinational logic 90 outputs what can be termed a combinational logic (CL) clock signal to the clock inputs of the data flip-flops. Thus, as shown in FIG. 3, combinational logic 90 couples the CL clock signal to the clock inputs of data flip-flops 82, 84, and 86.

The pipeline stage 80 in FIG. 3 is utilized as a building block in the sense that a larger self-timed data pipeline is constructed by coupling a number of these pipeline stages 80 together. It will be appreciated that the designer of a larger pipeline can change the functioning of the larger self-timed pipeline, or a select portion of a larger self-timed pipeline, by simply changing the design of the combinational logic 90 used within pipeline stages. In the embodiment illustrated in FIG. 3, combinational logic 90 receives as input signals $RDY_{IN}$ and $ACK_{IN}$, and provides as output signals, $RDY_{OUT}$ and $ACK_{OUT}$. In particular, combinational logic 90 receives $RDY_{IN}$ as an input signal from a preceding self-timed pipeline stage (not shown), and $ACK_{IN}$ as an input from a succeeding self-timed pipeline stage (not shown). Combinational logic 90 also outputs $RDY_{OUT}$ to this succeeding self-timed pipeline stage, and outputs ACK-$_{OUT}$ to this preceding self-timed pipeline stage.

Figure 4:
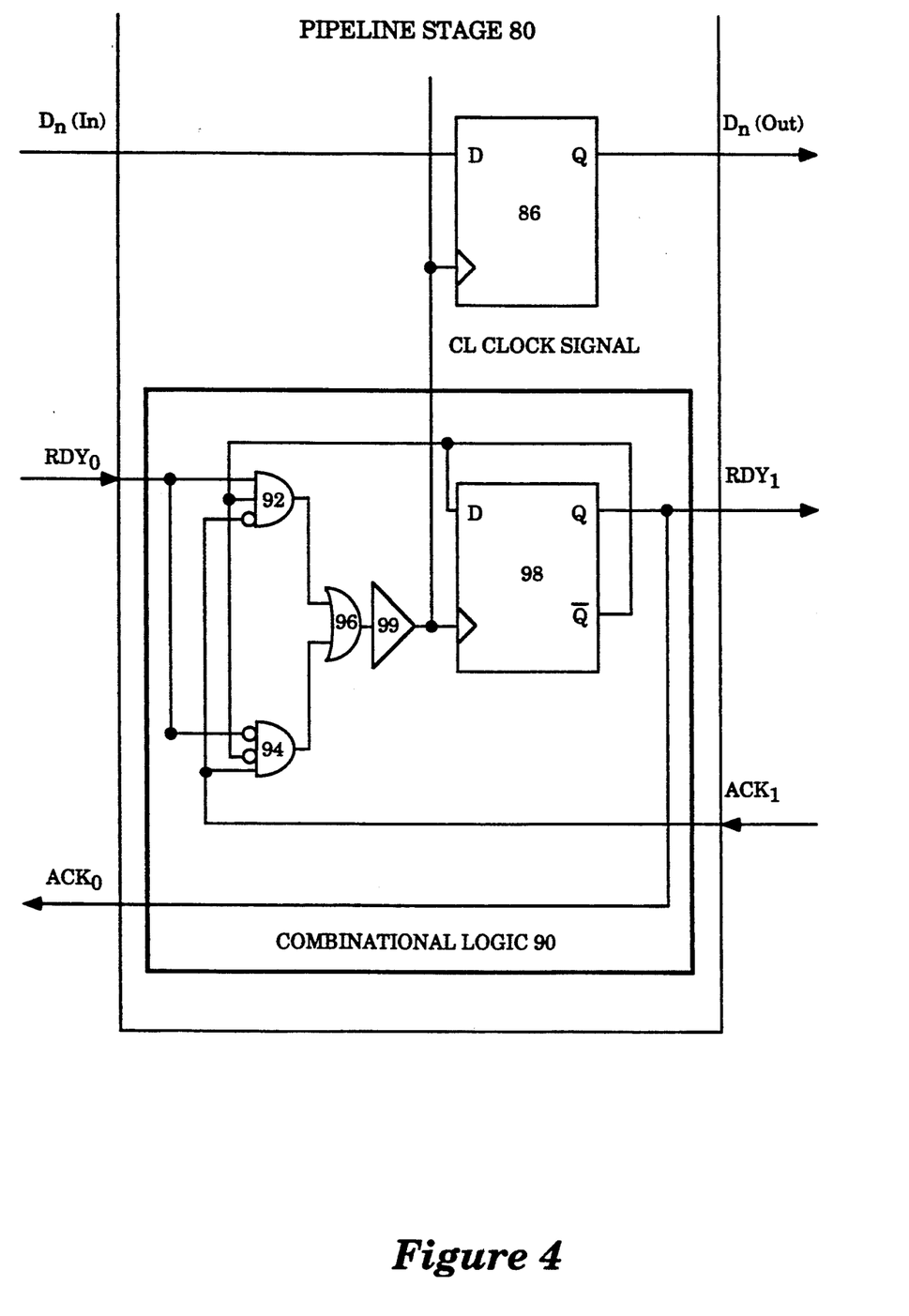
FIG. 4 illustrates a first embodiment of the combinational logic utilized with a pipeline stage designed in accordance with the present invention.

Referring now to FIG. 4, this figure illustrates one possible embodiment for combinational logic 90 within pipeline stage 80. As shown, in this embodiment, combinational logic 90 comprises a first logical AND gate 92, a second logical AND gate 94, logical OR gate 96, driver 99, and Toggle flip-flop 98. As illustrated, a RDY$_0$ signal is coupled as a first input to logical AND gate 92, and is inverted and coupled as a first input to logical AND gate 94. An ACK$_1$ signal is coupled as a second input to logical AND gate 94, and is inverted and coupled as a second input to logical AND gate 92. The $\overline{Q}$ output of Toggle flip-flop 98 is coupled as a third input to logical AND gate 92, and is inverted and coupled as a third input to logical AND gate 94. The output of logical AND gate 92 and the output of logical AND gate 94 are coupled to logical OR gate 96. The output of logical OR gate 96 is then coupled to driver 99. The output of driver 99 is the aforementioned combinational logic (CL) clock signal which is driven by driver 99 to the clock inputs of the data flip-flops in pipeline stage 80, including data flip-flop 86. The output of driver 99, the combinational logic (CL) clock signal, is also coupled internally to the clock input of Toggle flip-flop 98. The $\overline{Q}$ output of Toggle flip-flop 98 is coupled to the D input of Toggle flip-flop 98, while the Q output of Toggle flip-flop 98 outputs both the RDY$_1$ output signal and the ACK$_0$ output signal.

Figure 5:
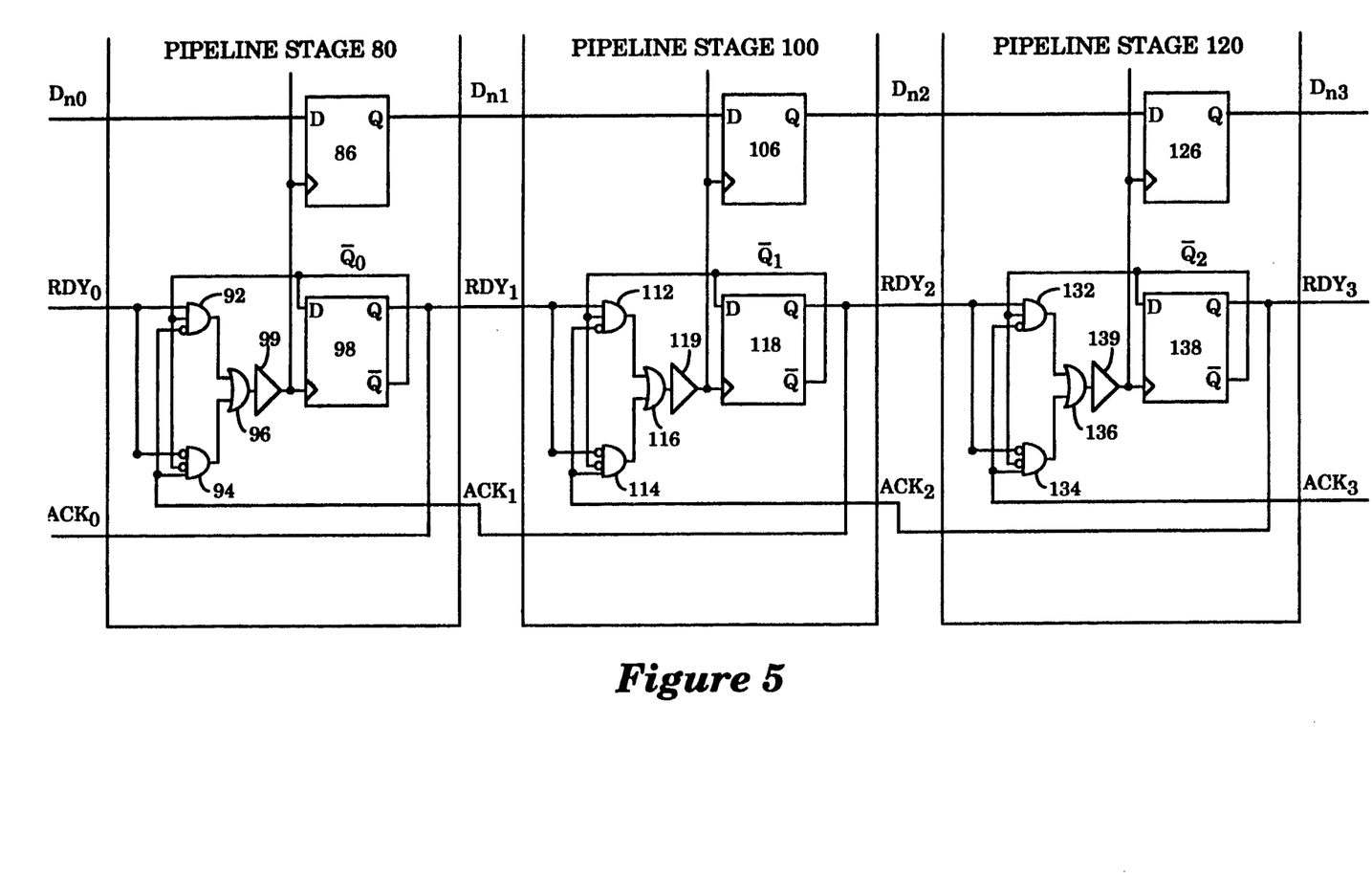
FIG. 5 illustrates a portion of a larger self-timed data pipeline constructed in accordance with the first embodiment.

With reference now to FIG. 5, this figure illustrates a portion of a larger self-timed data pipeline comprised of a plurality of pipeline stages constructed in accordance with the first embodiment depicted in FIG. 4. As shown in FIG. 5, pipeline stage 80 is coupled to a pipeline stage 100, which is, in turn, coupled to a pipeline stage 120. It will be appreciated that any additional preceding pipeline stages in the larger pipeline (not shown) would be coupled to, and precede, pipeline stage 80, while any succeeding pipeline stages (not shown) would be coupled to, and follow pipeline stage 120. For simplicity and clarity, FIG. 5 illustrates only the data flip-flops 86, 106, and 126 corresponding to a single bit, the single bit D$_n$. Additional data flip-flops corresponding to additional bits in a data word would be similarly configured in each pipeline stage 80, 100, and 120.

As will be described, pipeline stages 80, 100, and 120 communicate and pass data in an asynchronous fashion through the use of READY (RDY) and ACKNOWLEDGE (ACK) signals. For example, pipeline stage 80 indicates the availability of a new data word to pipeline stage 100 through the use of a RDY$_1$ signal. Pipeline stage 100 then indicates to pipeline stage 80 that it has passed this new data word from its data inputs to its data outputs by changing the state of the ACK$_1$ signal. As will be described, through the use of combinational logic, the present invention provides for an inexpensive and fast data pipeline without data overruns or overwrites.

Figure 6:
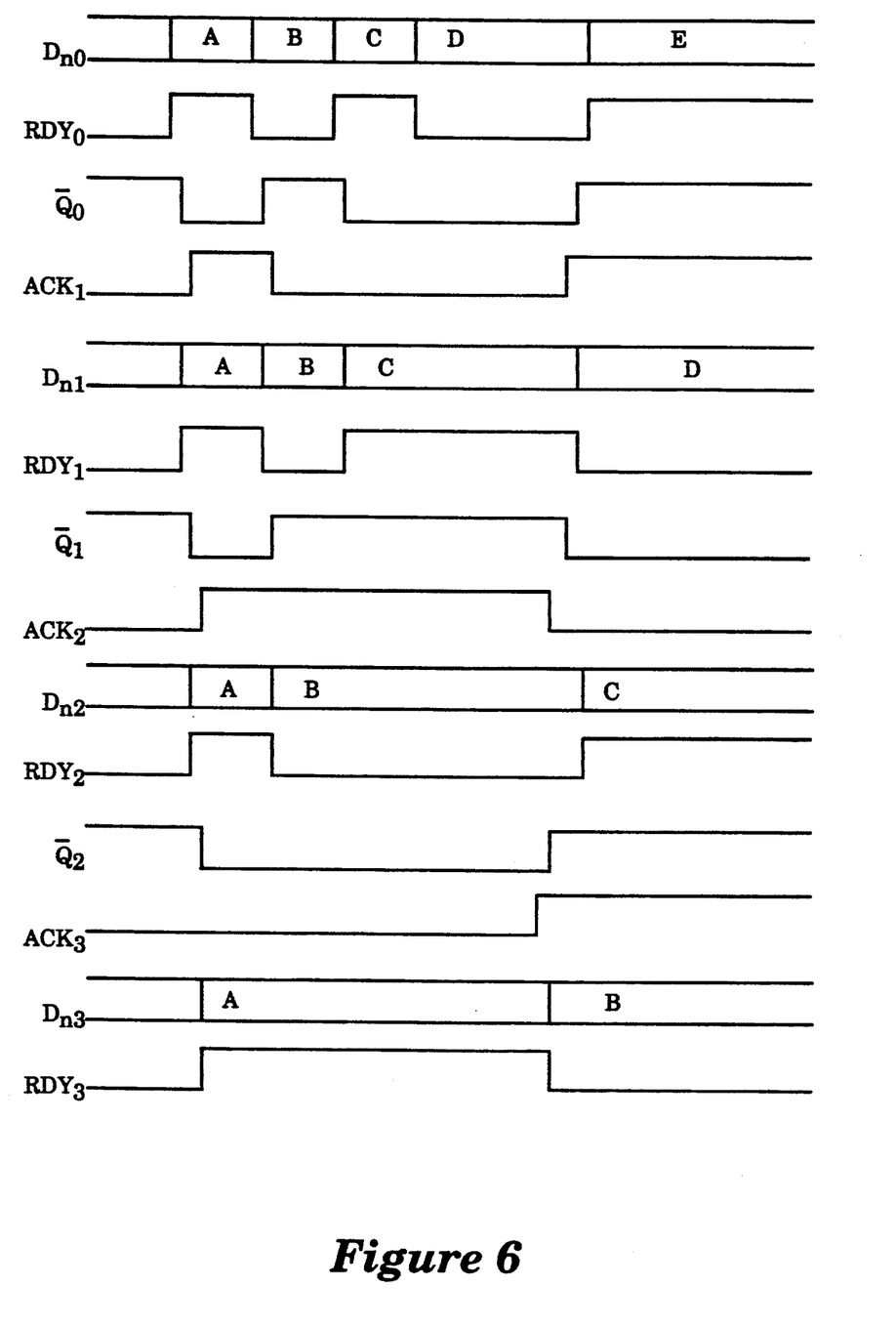
FIG. 6 is a sample timing diagram illustrating the advantageous operation of the portion of the larger self-timed data pipeline.

Referring to FIG. 6, this figure depicts a sample timing diagram which illustrates the operation of the pipeline stages shown in FIG. 5. Referring to both FIGS. 5 and 6, the operation of these pipeline stages will now be described. Initially, all the flip-flops in the larger pipeline, including flip-flops 86, 98, 106, 118, 126, and 138 are set to zero. Thus, RDY$_3$, ACK$_2$, RDY$_2$, ACK$_1$, RDY$_1$, ACK$_3$, RDY$_0$, and ACK$_0$ are all initially zero, whereas $\overline{Q}_0$, $\overline{Q}_1$, and $\overline{Q}_2$ are non-zero. The availability of a first data word "A" to the data inputs of pipeline stage 80 (including D$_{n0}$) is communicated to pipeline stage 80 with a rising edge of RDY$_0$. Thus, this rising edge of RDY$_0$, the $\overline{Q}_0$ output of flip-flop 98, and the inverse of ACK$_1$, are coupled to logical AND gate 92, yielding a rising edge output through logical OR gate 96. Driver 99 drives this rising edge to the clock input of Toggle flip-flop 98, and the data flip-flops in pipeline stage 80, including data flip-flop 86. Thus, data word "A" is clocked through the data flip-flops of pipeline stage 80, and a rising edge signal RDY$_1$ is clocked out of flip flop 98.

Data word "A" is now present at the data inputs of pipeline stage 100, including D$_{n1}$. The rising edge of RDY$_1$, the $\overline{Q}_1$ output of flip-flop 118, and the inverse of ACK$_2$, are coupled to logical AND gate 112, yielding a rising edge output through logical OR gate 116. Driver 119 drives this rising edge to the clock input of Toggle flip flop 118, and the clock inputs of the data flip-flops of pipeline stage 100, including data flip-flop 106. This results in the data word "A" being clocked through the data flip-flops of pipeline stage 100, including data flip-flop 106, and a rising edge signal RDY$_2$ is clocked out of flip flop 118.

Data word "A" is now present at the data inputs of pipeline stage 120, including D$_{n2}$. The rising edge of RDY$_2$, the $\overline{Q}_2$ output of flip-flop 138, and the inverse of ACK$_3$, are coupled to logical AND gate 132, yielding a rising edge output through logical OR gate 136. Driver 139 drives this rising edge to the clock input of Toggle flip flop 138, and the clock inputs of the data flip-flops of pipeline stage 120, including data flip-flop 126. This results in data word "A" being clocked through the data flip-flops of pipeline stage 120, including data flip flop 126, and a rising edge signal RDY$_3$ is clocked out of flip flop 138.

Accordingly, data word "A" has been asynchronously propagated from the data inputs of pipeline stage 80 to the data outputs of pipeline stage 120. From further reference to FIGS. 5 and 6 it will be appreciated that should data word "A" stall at the data outputs of pipeline stage 120, subsequent data words, for example, data words "B," "C," and "D" will propagate through the data pipeline, but will not overrun or overwrite data word "A."

Returning to the sample timing diagram of FIG. 6, this timing diagram depicts the stalling of data word "A" at the data outputs of pipeline stage 120. In particular, it will be appreciated that data word "A" will stall at the data outputs of pipeline stage 120 until ACK$_3$ changes. During this period of time during which pipeline stage 120 waits for ACK$_3$ to change, a data word "B" is propagated from the data inputs of pipeline stage 80 to the data outputs of pipeline stage 100 (which include D$_{n2}$), a data word "C" is propagated from the data inputs pipeline stage 80 to the data outputs of pipeline stage 80 (which include D$_{n1}$), and a data word "D" then stalls at the data inputs of pipeline 80. When the ACK$_3$ signal does change, data word "B" is propagated from the data inputs to the data outputs of pipeline stage 120, data word "C" is propagated from the data inputs to the data outputs of pipeline stage 100, data word "D" is propagated from the data inputs to the data outputs of pipeline stage 80, and a new data word "E" is presented to the data inputs of pipeline stage 80. A self-timed data pipeline constructed in accordance with the present invention can thus operate at a considerable rate of speed without data overwrites or overruns.

From the above description, it can be appreciated that the present invention provides for a self-timed data pipeline comprising what can be considered building block pipeline stages. The building block pipeline stages are easily replicated because they utilize combinational logic comprising standard logic elements. The present invention, therefore, provides for an inexpensive method or design methodology of constructing self-timed data pipelines without resorting to custom logic. A self-timed data pipeline can be constructed in accordance with the present invention by coupling a first pipeline stage comprising at least one data flip-flop, and combinational logic coupled to the clock input of the at least one data flip-flop, to a second pipeline stage. The second pipeline stage is similarly comprised of at least one data flip-flop and combinational logic coupled to the clock input of the at least one data flip-flop. In particular, the combinational logic of the first pipeline stage is coupled to the combinational logic of the second pipeline stage, and the at least one data flip flop of the first pipeline stage is coupled to the at least one data flip-flop of the second pipeline stage. Additional pipeline stages of similar compositions can be selectively coupled to the second pipeline stage to further construct a larger self-timed data pipeline.

It will additionally be appreciated that the present invention provides for an advantageous design methodology when the task of designing the actual physical layout of a self-timed data pipeline on a chip is considered. In particular, the designer of a self-timed data pipeline can initially construct a "hard macro" in accordance with the present invention. (The term "hard macro" refers to a fixed hardware cell or fixed hardware layout.) This hard macro will comprise an actual physical layout for the circuit elements in at least one pipeline stage. The characteristics and timing for this hard macro can readily be determined. The designer can then selectively use this hard macro to construct a larger data pipeline. Thereafter, based upon the known characteristics of each individual hard macro, the designer can analyze the timing and overall behavior of the larger data pipeline with computer software. Thus, the characteristics of the larger data pipeline can be determined quickly and adjustments made to the design relatively easily.

Figure 7:
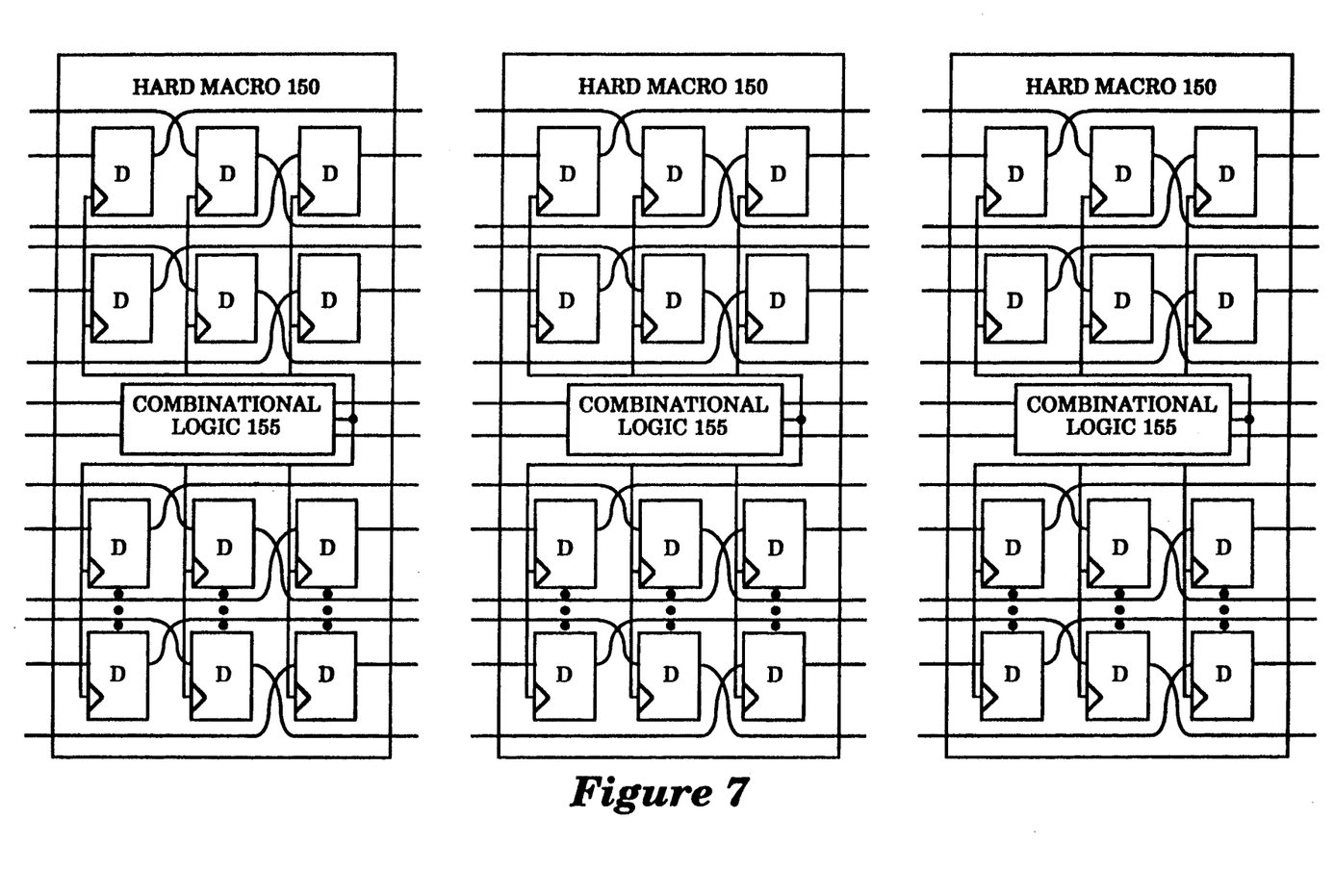
FIG. 7 illustrates one possible physical layout for a hard macro in accordance with the present invention.

One example of how such a hard macro might be configured is shown in a simplified figure, FIG. 7. This figure illustrates three identical hard macros using a particular physical layout labeled hard macro 150. The physical layout of hard macro 150 comprises a plurality of data flip-flops, denoted with "D," and a combinational logic block 155. Each data flip-flop "D" has a data input and a data output, as well as a clock input. Combinational logic 155 couples a combinational clock signal to each of the clock inputs of the data flip-flops. It will be appreciated that the particular number of data flip-flops in such a hard macro cell will depend upon such factors as the data word width. Assuming a designer wishes to utilize the physical layout of hard macro 150 as a building block to construct a larger data pipeline, the designer simply makes copies of hard macro 150 and then interconnects these copies. All the lines and interconnects which go between these interconnected copies will line up in a predictable and controlled fashion. With these interconnect distances set, and the behavior of the hard macro set, analysis and construction of the larger data pipeline is greatly facilitated.

While the present invention has been particularly described with reference to FIGS. 1 through 7, it should be understood that these figures are for illustration only and should not be taken as limitations upon the invention. It is further contemplated that many changes and modifications may be made to the invention, by one of ordinary skill in the art, without departing from the spirit and scope of the invention as disclosed herein.

I claim:

1. A parallel processing system comprising:
    a plurality of central processing units, each central processing unit capable of executing an instruction independently from all other central processing units;
    a plurality of processor nodes, each processing node being coupled to a different one of said plurality of central processing units, said plurality of processor nodes including a first processor node;
    means for routing data between said plurality of processor nodes;
    a network interface controller disposed within said first processor node said network interface controller means including a first pipeline stage comprising:
        a first data flip-flop, including a first data flip-flop data input, a first data flip-flop data output, and a first data flip-flop clock input,
        a first logical AND gate having a first input, a second input, and a third inverted input;
        a second logical AND gate having a first inverted input, a second inverted input, and a third input, said first inverted input coupled to said first input of said first logical AND gate, said second inverted input coupled to said second input of said first logical AND gate, and said third input coupled to said third inverted input of said first logical AND gate;
        a first logical OR gate coupled to said first logical AND gate and said second logical AND gate;
        a first driver coupled to said first logical OR gate and said first data flip-flop clock input;
        a first toggle flip-flop having a first toggle flip-flop input, a first toggle flip-flop output, a first toggle flip-flop inverted output, and a first toggle flip-flop clock input, wherein said first toggle flip-flop input is coupled to said first toggle flip-flop inverted output and said second input of said first logical AND gate, and said first toggle flip-flop clock input is coupled to said first driver;
        wherein a first READY signal is coupled to said first input of said first logical AND gate, a first ACKNOWLEDGE signal is coupled to said third inverted input of said first logical AND gate, and said toggle flip-flop output outputs a second READY signal and a second ACKNOWLEDGE signal;
    said network interface controller further comprising a second pipeline stage coupled to said first pipeline stage, said second pipeline stage comprising:
        a second data flip-flop, including a second data flip-flop data input, a second data flip-flop data output, and a second data flip-flop clock input,
        a third logical AND gate having a first input, a second input, and a third inverted input;
        a fourth logical AND gate having a first inverted input, a second inverted input, and a third input, said first inverted input coupled to said first input of said third logical AND gate, said second inverted input coupled to said second input of said third logical AND gate, and said third input coupled to said third inverted input of said third logical AND gate;

a second logical OR gate coupled to said third logical AND gate and said fourth logical AND gate;

a second driver coupled to said second logical OR gate and said second data flip-flop clock input;

a second toggle flip-flop having a second toggle flip-flop input, a second toggle flip-flop output, a second toggle flip-flop inverted output, and a second toggle flip-flop clock input, wherein said second toggle flip-flop input is coupled to said second toggle flip-flop inverted output and said second input of said third logical AND gate, and said second toggle flip-flop clock input is coupled to said second driver;

wherein said second READY signal is coupled to said first input of said third logical AND gate, said second toggle flip-flop output provides said first ACKNOWLEDGE signal to said third inverted input of said first logical AND gate, and outputs a third READY signal, and a third ACKNOWLEDGE signal is coupled to said third inverted input of said third logical AND gate.

* * * * *